United States Patent [19]
Lee, Jr. et al.

[11] Patent Number: 5,916,970
[45] Date of Patent: Jun. 29, 1999

[54] COMPATIBILIZED BLENDS OF POLYPHENYLENE ETHER AND POLYPHTHALAMIDE

[75] Inventors: Gim Fun Lee, Jr., Albany; John Bennie Yates, Glenmont; Ronald James Wroczynski, Schenectady, all of N.Y.; Kevin Sheehan, Avon Lake, Ohio

[73] Assignee: General Electric Company, Pittsfield, Mass.

[21] Appl. No.: 08/779,932

[22] Filed: Jan. 6, 1997

Related U.S. Application Data

[62] Division of application No. 08/472,798, Jun. 7, 1995, abandoned.

[51] Int. Cl.[6] ............................. C08L 71/12; C08L 77/00
[52] U.S. Cl. ........................ 525/133; 525/92 B; 525/397; 524/279; 524/487
[58] Field of Search ................................. 525/92 B, 133, 525/397; 524/279, 487

[56] References Cited

U.S. PATENT DOCUMENTS

| | | |
|---|---|---|
| 4,315,086 | 2/1982 | Ueno et al. . |
| 4,338,421 | 7/1982 | Maruyama et al. . |
| 4,600,741 | 7/1986 | Aycock et al. . |
| 4,642,358 | 2/1987 | Aycock et al. . |
| 4,654,405 | 3/1987 | Jalbert . |
| 4,659,760 | 4/1987 | van der Meer . |
| 4,728,693 | 3/1988 | Droscher et al. . |
| 4,743,651 | 5/1988 | Shibuya et al. . |
| 4,745,157 | 5/1988 | Yates, III et al. . |
| 4,755,566 | 7/1988 | Yates, III . |
| 4,760,115 | 7/1988 | Droescher et al. . |
| 4,772,664 | 9/1988 | Uena et al. . |
| 4,792,586 | 12/1988 | Han . |
| 4,798,865 | 1/1989 | Grant et al. . |
| 4,822,836 | 4/1989 | Wroczynski . |
| 4,822,837 | 4/1989 | van der Meer . |
| 4,824,915 | 4/1989 | Aycock et al. . |
| 4,826,933 | 5/1989 | Grant et al. . |
| 4,839,425 | 6/1989 | Mawatari et al. . |
| 4,857,575 | 8/1989 | van der Meer et al. . |
| 4,859,739 | 8/1989 | Yates, III et al. . |
| 4,866,114 | 9/1989 | Taubitz et al. . |
| 4,873,286 | 10/1989 | Gallucci et al. . |
| 4,874,810 | 10/1989 | Lee, Jr. et al. . |
| 4,877,847 | 10/1989 | Masu et al. . |
| 4,885,334 | 12/1989 | Mayumi et al. . |
| 4,888,397 | 12/1989 | van der Meer et al. . |
| 4,889,889 | 12/1989 | Yates, III . |
| 4,923,924 | 5/1990 | Grant . |
| 4,929,675 | 5/1990 | Abe et al. . |
| 4,957,965 | 9/1990 | Taubitz et al. . |
| 4,960,825 | 10/1990 | van der Meer . |
| 4,963,620 | 10/1990 | Grant et al. . |
| 4,968,749 | 11/1990 | Shibuya et al. . |
| 4,981,920 | 1/1991 | Terashima et al. . |
| 4,990,564 | 2/1991 | Taubitz et al. . |
| 5,000,897 | 3/1991 | Chambers . |
| 5,001,181 | 3/1991 | Takagi et al. . |
| 5,017,652 | 5/1992 | Abe et al. . |
| 5,017,663 | 5/1991 | Mizuno et al. . |
| 5,019,626 | 5/1991 | Taubitz et al. . |
| 5,026,787 | 6/1991 | Takagi et al. . |
| 5,039,746 | 8/1991 | Neugebauer et al. . |
| 5,041,504 | 8/1991 | Brown et al. . |
| 5,053,458 | 10/1991 | Taubitz et al. . |
| 5,055,494 | 10/1991 | van der Meer . |
| 5,069,818 | 12/1991 | Aycock et al. . |
| 5,070,151 | 12/1991 | Mizuno et al. . |
| 5,073,596 | 12/1991 | Inoue et al. . |
| 5,073,620 | 12/1991 | Sanada et al. . |
| 5,084,523 | 1/1992 | Neugebauer et al. . |
| 5,086,105 | 2/1992 | Abe et al. . |
| 5,091,473 | 2/1992 | Arashiro et al. . |
| 5,096,979 | 3/1992 | Brown et al. . |
| 5,109,052 | 4/1992 | Kasai et al. . |
| 5,112,907 | 5/1992 | Nishio et al. . |
| 5,115,010 | 5/1992 | Sakai et al. . |
| 5,115,044 | 5/1992 | Neugebauer . |
| 5,120,800 | 6/1992 | Tsukahara et al. . |
| 5,120,801 | 6/1992 | Chambers . |
| 5,122,575 | 6/1992 | White et al. . |
| 5,124,391 | 6/1992 | Muehlbach et al. . |

(List continued on next page.)

FOREIGN PATENT DOCUMENTS

| | | |
|---|---|---|
| 0 147 874 B1 | 10/1984 | European Pat. Off. . |
| 0 237 187 A1 | 2/1987 | European Pat. Off. . |
| 0 362 439 A1 | 8/1988 | European Pat. Off. . |
| 0 369 169 A1 | 10/1989 | European Pat. Off. . |
| 0 381 390 A2 | 1/1990 | European Pat. Off. . |
| 0 398 043 A3 | 4/1990 | European Pat. Off. . |
| 0 436 136 A1 | 12/1990 | European Pat. Off. . |
| 0 451 563 A2 | 3/1991 | European Pat. Off. . |
| 0 506 386 A2 | 3/1992 | European Pat. Off. . |
| 0 516 150 A1 | 5/1992 | European Pat. Off. . |
| 0 523 368 A1 | 6/1992 | European Pat. Off. . |
| 0 528 581 A1 | 8/1992 | European Pat. Off. . |
| 0 491 187 A1 | 11/1992 | European Pat. Off. . |
| 0 549 268 A2 | 12/1992 | European Pat. Off. . |
| 0 550 206 A2 | 12/1992 | European Pat. Off. . |
| 0 559 485 A1 | 3/1993 | European Pat. Off. . |
| 597648-A1 | 5/1994 | European Pat. Off. . |
| 4-39354 | 2/1992 | Japan . |
| 4-88058 | 3/1992 | Japan . |
| 4-198354 | 7/1992 | Japan . |
| 4-202256 | 7/1992 | Japan . |
| WO 88/06167 | 8/1988 | WIPO . |
| WO 93/13251 | 7/1993 | WIPO . |

Primary Examiner—David Buttner

[57] ABSTRACT

Polymer blend compositions comprise (a) a polyphenylene ether polymer, (b) a polyphthalamide comprising the reaction product of (i) hexamethylene diamine or a mixture of hexamethylene diamine and trimethylhexamethylene diamine, and (ii) terephthalic acid, and optionally (iii) at least one acid selected from the group consisting of isophthalic acid and adipic acid, provided that a mixture of said diamines is employed if reactant (iii) is absent, and (c) at least one compatibilizer. The compositions may further include an aliphatic polyamide and/or an impact modifier.

5 Claims, No Drawings

U.S. PATENT DOCUMENTS

| | | |
|---|---|---|
| 5,132,365 | 7/1992 | Gallucci ................................... 525/66 |
| 5,134,196 | 7/1992 | van der Meer . |
| 5,145,904 | 9/1992 | Muehlbach et al. . |
| 5,147,942 | 9/1992 | Abe et al. . |
| 5,153,266 | 10/1992 | Muehlbach et al. . |
| 5,159,008 | 10/1992 | Nishida et al. . |
| 5,159,018 | 10/1992 | Nishio et al. . |
| 5,159,075 | 10/1992 | Phanstiel et al. . |
| 5,162,433 | 11/1992 | Nishio et al. . |
| 5,162,440 | 11/1992 | Akkepeddi et al. . |
| 5,162,447 | 11/1992 | Abe et al. . |
| 5,166,237 | 11/1992 | Abe et al. . |
| 5,175,211 | 12/1992 | Sanada et al. . |
| 5,182,336 | 1/1993 | Abe et al. . |
| 5,210,125 | 5/1993 | Pernice et al. . |
| 5,212,256 | 5/1993 | Mizuno et al. . |
| 5,225,270 | 7/1993 | Bhoori et al. . |
| 5,237,002 | 8/1993 | Nishio et al. . |
| 5,244,973 | 9/1993 | Sakazume et al. . |
| 5,248,728 | 9/1993 | Lee, Jr. . |
| 5,262,478 | 11/1993 | Nishio et al. . |
| 5,266,673 | 11/1993 | Tsukahara et al. . |
| 5,288,786 | 2/1994 | Nishio et al. . |
| 5,296,533 | 3/1994 | Nagaoka et al. . |
| 5,310,821 | 5/1994 | Kodaira et al. . |
| 5,331,060 | 7/1994 | Aycock et al. . |
| 5,336,732 | 8/1994 | Samuels . |
| 5,378,750 | 1/1995 | Sayed et al. . |
| 5,397,838 | 3/1995 | Ohtomo ................................... 525/66 |
| 5,561,193 | 10/1996 | Gottschalk ............................... 525/63 | ically, it is an object of the present invention to

COMPATIBILIZED BLENDS OF POLYPHENYLENE ETHER AND POLYPHTHALAMIDE

This is a divisional of application Ser. No. 08/472,798 filed on Jun. 07, 1995 now abandoned.

FIELD OF THE INVENTION

The present invention relates to compatibilized blends of polyphenylene ether and polyphthalamide polymers. The present invention is particularly directed to such compositions which exhibit reduced moisture-related dimensional instability and/or reduced thermal-related dimensional instability as compared with conventional blend compositions containing polyphenylene ether and polyamides.

BACKGROUND OF THE INVENTION

Polyphenylene ether polymers and resins are characterized by a unique combination of chemical, physical and electrical properties over a temperature range of more than 600° F., extending from a brittle point of about −275° F. to a heat distortion temperature of about 375° F. This combination of properties renders the polyphenylene ethers suitable for a broad range of applications. However, the usefulness of the polyphenylene ethers alone is limited owing to their poor processibility, impact resistance and chemical resistance.

Accordingly, polyphenylene ether polymers are often blended with one or more additional polymers to improve processibility, impact resistance, and/or chemical resistance. The Finholt U.S. Pat. No. 3,379,792 discloses blends of polyphenylene ether resins with a polyamide in order to improve the processibility of the polyphenylene ether resins. Typical polyamides for use in combination with polyphenylene ethers include nylon 6 and nylon 6,6. However, articles molded from such blend compositions often change dimensions as they gain or lose moisture. The moisture-related dimensional instability results from the addition of the nylon components. In the past, moisture-related dimensional instability caused by the nylon components has been reduced by using additives such as phenols. However, the phenolic additives also tend to reduce the melting points of the nylon components, whereby the desirable reduction in moisture-related dimensional instability is accompanied by an undesirable reduction in the heat deflection temperature of the blend compositions.

Blend compositions of polyphenylene ethers and nylon polyamides also exhibit a degree of dimensional instability caused by thermal expansions and contractions. The thermal-related dimensional instability results from the high coefficients of thermal expansion of the nylon polyamides relative to polyphenylene ethers. In the past, fillers of glass and/or minerals have been added to the compositions in order to reduce the thermal-related dimensional instability of these compositions. However, such fillers also reduce impact properties and the quality of the surface appearance of molded articles.

Thus, a need exists for blends of polyphenylene ether and polyamide which exhibit reductions in moisture-related and/or thermal-related dimensional instability, particularly without compromising other advantageous properties of such compositions.

The inclusion of a compatibilizer in blends of polyphenylene ethers and polyamides in order to improve the compatibility of these two polymer components is known. Suitable compatibilizers are disclosed, for example, in the Ueno et al U.S. Pat. No. 4,315,086, the Gallucci et al U.S. Pat. No. 4,873,286 and the Gianchandai et al U.S. Pat. No. 4,997,612.

SUMMARY OF THE INVENTION

Accordingly, it is an object of the present invention to provide improved blends of polyphenylene ether and polyamide polymer components which overcome the disadvantages of prior art polyphenylene ether-polyamide blend compositions. It is a more specific object of the invention to provide polyphenylene ether-polyamide blend compositions which exhibit reduced moisture-related dimensional instability and/or reduced thermal-related dimensional instability as compared with conventional blends of polyphenylene ether and nylon polyamides. It is a related object to provide such compositions while avoiding significant reductions in heat deflection temperatures and impact properties of the blends and while maintaining the good surface appearance of articles molded from such blend compositions.

These and additional objects are provided by the polymer blend compositions of the present invention. The present polymer blend compositions comprise a polyphenylene ether polymer, a polyamide component which comprises a polyphthalamide, and at least one compatibilizer for the polyphenylene ether polymer and the polyphthalamide. The polyphthalamide comprises the reaction product of (i) hexamethylene diamine or a mixture of hexamethylene diamine and trimethyl hexamethylene diamine, and (ii) terephthalic acid, and optionally, (iii) at least one acid selected from the group consisting of isophthalic acid and adipic acid, provided that a mixture of the diamines is employed if reactant (iii) is absent. An additional polyamide component, for example, a conventional nylon polyamide, and/or an impact modifier may also be included in the compositions. Applicants have discovered that the polyphthalamide component can be blended with the polyphenylene ether resin to provide the polyphenylene ether resin with improved chemical resistance and processibility and that the resulting blend compositions exhibit reduced moisture-related dimensional instability and/or reduced thermal-related dimensional instability as compared with conventional polyphenylene ether-polyamide blend compositions. Thus, the blend compositions of the present invention exhibit an advantageous combination of properties which expand their use in various applications.

These and additional objects and advantages of the present invention will be more fully apparent in view of the following detailed description.

DETAILED DESCRIPTION

The polymer blend compositions of the present invention comprise a polyphenylene ether polymer, a polyphthalamide and at least one compatibilizer. The compositions may further comprise at least one additional polyamide component and/or an impact modifier.

Polyphenylene ether resins are well known in the art and are generally of the formula

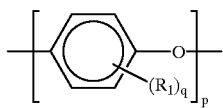

wherein each $R_1$ is individually selected from the group consisting of halogen, alkyl, aryl and alkoxy, q is from 0 to 4 and p is at least 20. When $R_1$ comprises an alkyl group, an aryl group or an alkoxy group, the group suitably contains from about 1 to about 12 carbon atoms.

The polyphenylene ether polymers suitable for use in the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875, in the Stamatoff U.S. Pat. Nos. 3,257,357 and 3,257,358 and in U.S. Pat. No. 4,935,472 of S. B. Brown et al, all of which are incorporated herein by reference. Throughout the specification and claims the term "polyphenylene ether resin" includes unsubstituted polyphenylene ether polymers, substituted polyphenylene ether polymers (wherein the aromatic ring is substituted), polyphenylene ether copolymers and blends thereof.

Preferred polyphenylene ether polymers adapted for use in the present invention include, but are not limited to, poly(2,6-dimethyl-1,4-phenylene)ether; poly(2,3,6-trimethyl-1,4-phenylene) ether; poly(2,6-diethyl-1,4-phenylene)ether; poly(2-methyl-6-propyl-1,4-phenylene) ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene) ether; poly(2,6-dibromo-1,4-phenylene)ether; poly(3-bromo-2,6-dimethyl-1,4-phenylene)ether, copolymers thereof and mixtures thereof, and the like. Particularly preferred polyphenylene ether polymers for use in the compositions of the present invention include poly(2,6-dimethyl-1,4-phenylene) ether, poly(2,3,6-trimethyl-1,4-phenylene)ether, blends of these polymers and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297, which is also incorporated herein by reference.

The polyphthalamide component of the present compositions comprises a reaction product of (i) hexamethylene diamine or a mixture of hexamethylene diamine and trimethyl hexamethylene diamine, and (ii) terephthalic acid, and optionally (iii) at least one acid selected from the group consisting of isophthalic acid and adipic acid, provided that a mixture of the diamines is employed if reactant (iii) is absent. These polyphthalamides are generally crystalline in nature and exhibit improved tensile strength and high heat deflection temperatures. These polyphthalamides, and methods for their preparation, are disclosed in the Poppe et al U.S. Pat. Nos. 4,603,166 and 4,617,342, and in European Patent Applications Nos. 121,983, 121,984, 121,985, 122,688 and 395,414, all of which are incorporated herein by reference.

For example, the Poppe et al U.S. Pat. No. 4,603,166 and European Patent Application No. 121,984 disclose polyphthalamides prepared from hexamethylene diamine, terephthalic acid and adipic acid and from hexamethylene diamine, terephthalic acid, isophthalic acid and adipic acid. The hexamethylene diamine: terephthalic acid: isophthalic acid: adipic acid mole ratio employed therein is in the range of about 100:65-95:25-0:35-5. The Poppe et al U.S. Pat. No. 4,617,342 and European Patent Application No. 122,688 disclose polyphthalamides formed from a mixture of hexamethylene diamine and trimethyl hexamethylene diamine in a molar ratio of from about 98:2 to about 60:4 and a mixture of terephthalic acid and isophthalic acid in a molar ratio of at least 80:20 to about 99:1. European Patent Application No. 121,985 discloses polyphthalamides prepared from a mixture of hexamethylene diamine and trimethyl hexamethylene diamine in a mole ratio of from about 55/45 to about 95/5 and terephthalic acid. The mole ratio of the terephthalic acid to the diamines is preferably in the range of 1.2:1 to 1:1.2, and more preferably about 1:1. European Patent Application No. 121,983 discloses polyphthalamides prepared from mixtures of hexamethylene diamine and trimethyl hexamethylene diamine and mixtures of terephthalic acid and adipic acid or mixtures of terephthalic acid, isophthalic acid and adipic acid. The mole ratio of hexamethylene diamine to trimethyl hexamethylene diamine is in the range of about 55/45 to about 98/2. When a mixture of terephthalic acid and adipic acid is employed, the mole ratio of the diamines, terephthalic acid and adipic acid is in the range of about 100/61/39 to 100/95/5. When the mixture of terephthalic acid, isophthalic acid and adipic acid is employed, the mole ratio of the diamines, terephthalic acid and a mixture of isophthalic acid and adipic acid is in the range of about 100/61/39 to 100/95/5, with the molar ratio of isophthalic acid to adipic acid in the mixture being about 38/1 to 1/38. Any of these crystalline polyphthalamides are suitable for use in the compositions of the present invention and may be prepared in accordance with the teachings of the aforementioned Poppe et al U.S. patents and the cited European patent applications.

The present compositions further include at least one compatibilizer for compatibilizing the polyphenylene ether polymer and the polyphthalamide. The at least one compatibilizer is selected from the group consisting of liquid diene polymers, polycarboxylic acids or derivatives thereof, an oxidized polyolefin wax, and a compound containing an acyl functional group. These compatibilizers are disclosed in the Gianchandai et al U.S. Pat. No. 4,997,612, incorporated herein by reference, for use in polyphenylene ether-polyamide resin compositions.

Examples of liquid diene polymers suitable for use in the compositions of the present invention include, for example, homopolymers of a conjugated diene compound and copolymers of the conjugated diene compound and at least one comonomer selected from the group consisting of additional conjugated diene compounds, olefins, aromatic vinyl compounds and acetylenic compounds. These liquid diene polymers are set forth in further detail in the Ueno et al U.S. Pat. No. 4,315,086, incorporated herein by reference.

The polycarboxylic acids and derivatives thereof which are suitable for use as the compatibilizer in the present compositions is preferably of the formula $(R^1O)R(COOR^2)_n (CONR^3R^4)_s$, or a derivative thereof, wherein R is a linear or a branched chain, saturated aliphatic hydrocarbon of from 2 to 20 carbon atoms; $R^1$ is selected from the group consisting of hydrogen and alkyl, aryl, acyl and carbonyl dioxy groups of from 1 to 10 carbon atoms; each $R^2$ is independently selected from the group consisting of hydrogen and alkyl and aryl groups of from 1 to 20 carbon atoms; each of $R^3$ and $R^4$ is independently selected from the group consisting of hydrogen and alkyl and aryl groups of from 1 to 10 carbon atoms; each of n and s is individually equal to or grater than 0 and n and s combined are greater than or equal to 2; and $(OR^1)$ is alpha or beta to a carbonyl group and at least 2 carbonyl groups are separated by 2 to 6 carbon atoms. Polycarboxylic acids of this type and derivatives thereof are described in further detail in the Gallucci et al U.S. Pat. No. 4,873,286 which is incorporated herein by reference. Preferred polycarboxylic acids comprise citric acid and salts and hydrates thereof. Acid esters derived from the polycarboxylic acids may also be employed as a compatibilizer in the compositions of the present invention. Examples of such esters include acetyl citrate and mono- and di-stearyl citrates. Acid amines may also be employed, for example N,N'-diethyl citric acidamide. Examples of suitable derivatives of the polycarboxylic acid include the salts thereof, including the salts with amines and the alkali metal and alkaline metal salts. Suitable salts include, but are not limited to, calcium citrate, potassium citrate, calcium malate and potassium malate.

Examples of oxidized polyolefin waxes suitable for use as the compatibilizer in the compositions of the present invention are known in the art, for example as set forth in the Van Der Meer U.S. Pat. No. 4,659,760, which is incorporated herein by reference. One example of an oxidized polyolefin wax comprises oxidized polyethylene wax. As is known in the art, organic phosphates may be used in combination with the wax.

Compounds containing an acyl functional group suitable for use as the compatibilizer in the present invention are described in the Aycock et al U.S. Pat. Nos. 4,642,358 and 4,600,741, both of which are incorporated herein by reference. Suitable compounds containing an acyl functional group which may be used as the compatibilizer include, but are not limited to, chloroethylanoylsuccinic anhydride, chloroformyl succinic anhydride, trimellitic anhydride acid chloride, trimellitic anhydride acid acetic anhydride, 1-acetoxy acetyl-3,4-dibenzoic acid anhydride and terephthalic acid acid chloride. In one embodiment, the acyl-containing compound may be reacted with a portion of the polyphenylene ether polymer to form a modified polyphenylene polymer. Preparation of the modified polyphenylene ethers are disclosed in the aforementioned Aycock et al patents and generally may be effected by reaction of the polyphenylene ether with the acyl functional compounds, for example, trimellitic anhydride acid chloride, in the presence of heat and solvent.

The polyphenylene ether, the polyphthalamide and the compatibilizer may be included in the compositions of the present invention in varying amounts, depending on the intended application of the compositions. In a preferred embodiment, the compositions comprise from about 5 to about 95 weight percent of the polyphenylene ether, from about 5 to about 95 weight percent of the polyphthalamide, and the compatibilizer in an amount sufficient to improve the compatibility of the polyphenylene ether polymer and the polyphthalamide, preferably in an amount of from about 0.05 to about 4 weight percent, based on these three components. More preferably, the compositions comprise from about 20 to about 80 weight percent of the polyphenylene ether polymer, from about 20 to about 80 weight percent of the polyphthalamide and from about 0.1 to about 2 weight percent of the compatibilizer, based on these three components.

The compositions of the present invention may further include an aliphatic polyamide. Aliphatic polyamides are well known in the art, as are their methods of preparation. Examples of aliphatic polyamides suitable for use in the present compositions include, but are not limited to, polyamide 6, polyamide 66, polyamide 11, polyamide 12, polyamide 63, polyamide 64, polyamide 6/10 and polyamide 6/12. When the aliphatic polyamide is included in the blend compositions of the invention, it is preferred that the compositions comprise from about 25 to about 75 weight percent, and more preferably from about 30 to about 60 weight percent, of the polyphenylene ether polymer, from about 1 to about 50 weight percent, and more preferably from about 10 to about 40 weight percent of the polyphthalamide, from about 1 to about 50 weight percent, and more preferably from about 5 to about 40 weight percent, of the aliphatic polyamide, and from about 0.1 to about 2 weight percent of the compatibilizer, based on these four components.

The compositions of the invention may further include an impact modifier. Various impact modifiers are known in the art adn are suitable for use in the compositions of the present invention. In a preferred embodiment, the impact modifier comprises a vinyl aromatic polymer of one of the types described below. In an alternate embodiment, the impact modifier may comprise a rubber, natural or synthetic, or an elastomer, many of which are well known in the art. For example, the impact modifier may comprise an EPDM rubber, a polybutylacrylate rubber, a diene rubber, for example, polybutadiene, isoprene or the like, a cycloolefin, or the like. The vinyl aromatic impact modifiers suitable for use in the present compositions contain units derived from a monomer of a formula:

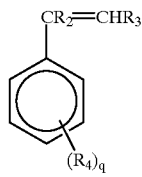

wherein $R_2$ and $R_3$ are selected from the group consisting of lower alkyl or alkenyl groups of from, for example, 1 to 6 carbon atoms and hydrogen, each $R_4$ is selected from the group consisting of halogen and lower alkyl or alkenyl groups of from, for example, 1 to 6 carbon atoms, and q is an integer of from 0 to 5.

In one embodiment, the vinyl aromatic impact modifier comprises a rubber-modified polystyrene polymer, conventionally known in the art as HIPS (high impact polystyrene). The rubber-modified polystyrene polymer may be formed by addition of a rubber to a preformed polystyrene polymer or by addition of the rubber to styrene monomer which is then polymerized in the presence of the rubber. Both of these methods are well known in the art and may be employed in producing a rubber-modified polystyrene polymer for use as an impact modifier in the present compositions.

In a further embodiment, the vinyl aromatic impact modifier comprises a block copolymer of a vinyl aromatic monomer and an alkene hydrocarbon monomer or a conjugated diene monomer. Various types of such block copolymers are known in the art. For example, the block copolymer may comprise a tapered linear block copolymer which generally comprises blocks of A and B, wherein A is a polymerized vinyl aromatic hydrocarbon block and B is a hydrogenated, partially hydrogenated, or non-hydrogenated block derived from at least one polymerized conjugated diene. Tapered linear block copolymers are known in the art, as are their methods of preparation, and are taught, for example, in U.S. Pat. Nos. 4,948,832, 4,939,207, 4,918,145, 4,914,248, 4,913,971 and 4,116,917, all of which are incorporated herein by reference. Tapered triblock polymers are available commercially under the tradename Finacleare® 520 from Fina Oil Company.

In one embodiment, the block copolymers may be represented by the formula A-B-a wherein the terminal blocks A, which may be the same or different, are thermoplastic homopolymers or copolymer prepared from a vinyl aromatic compound. Examples of the vinyl aromatic compound include, but are not limited to, styrene, alpha-methylstyrene, vinyl toluene, vinyl xylene, ethylvinyl xylene, vinyl naphthalene and the like, or mixtures thereof. The center block B comprises an elastomeric polymer derived from alkene hydrocarbons such as ethylene or butylene, conjugated dienes or the like, or mixtures thereof. The block copolymers may be subjected to a hydrogenation process whereby the unsaturated rubber block portion of the copolymer is hydrogenated. Hydrogenation may be accomplished using conventional hydrogenation catalysts and reaction conditions. In the hydrogenated block copolymers, the terminal blocks A may have an average molecular weight of from about 4,000 to about 115,000 while the center blocks B have an average molecular weight of from about 20,000 to about 450,000. Hydrogenated block copolymers are specifically described in the Jones U.S. Pat. No. 3,431,323 and the DeLaMare et al U.S. Pat. No. 3,670,054, both of which are incorporated herein by reference. Suitable block copolymers for use in the present invention comprise hydrogenated or nonhydrogenated styrene-butadiene-styrene (styrene-ethylene-butylene-styrene) block copolymers and hydrogenated or nonhydrogenated styrene-isoprene-styrene block copolymers. Alternatively, these block copolymers may be functionalized in a manner well known in the art. Block copolymers of this type are commercially available under the tradenames Kraton® from Shell Chemical and Septon® from Kuraray Co., Ltd.

In another embodiment, the vinyl aromatic impact modifier comprises a radial block copolymer of a vinyl aromatic monomer and a conjugated diene monomer. These radial block copolymers are also well known in the art. Copolymers of this type generally comprise from about 60 to about 95 percent by weight polymerized vinyl aromatic monomer and about 50 to about 5 percent by weight polymerized conjugated diene monomer. The copolymer has at least three polymer chains which form a radial configuration, and each chain usually terminates with the substantially non-elastomeric segment, to which an elastomeric polymer segment is joined. These block copolymers are also referred to as "polymodal branched block copolymers" and "star polymers." Examples of radial block copolymers are set forth in the Kitchen et al U.S. Pat. No. 3,639,517 which is incorporated herein by reference. These block copolymers are commercially available under the tradename K-Resin® from Phillips Petroleum.

Alternatively, the radial block copolymer of a vinyl aromatic monomer in a conjugated monomer may comprise a radial teleblock copolymer which contains segments or blocks which themselves comprise a conjugated diene polymer, vinyl aromatic polymer blocks, and a coupling agent. These block copolymers are sometimes referred to as "branched" polymers and are set forth in U.S. Pat. No. 4,097,550, which is incorporated herein by reference. The radial teleblock copolymers are prepared by methods known in the art, for example, as disclosed in the Zelinski et al U.S. Pat. No. 3,281,383, incorporated herein by reference. These polymers are also available commercially, for example, as the Finaprene® products, grades 401, 411, 414, 416 and 417, from Fina Oil Company.

In an alternate embodiment, the impact modifier comprises a cycloolefin polymer such as, for example, polyoctenylene. A polyoctenylene with a J value of 120 cm$^3$/g and a trans-content of 80% is available under the name VESTENAMER® 8012 (manufacturer: HUELS AKTIENGESELLSCHAFT, D-4370 Marl). Other characteristic data for this product can be found in the journal "Kautschuk, Gummi, Kunststoffe" (1981), pages 185 to 190, and in Huels pamphlet No. 2247 "VESTENAMER® 8012". The polyoctenylene can also be made, for example, by the method of K. J. Ivin "Olefin Metathesis", Academic Press, pages 236 ff., 1983, and the other literature references indicated there.

When the impact modifier is included in compositions comprising the polyphenylene ether polymer, the polyphthalamide and the compatibilizer, the compositions preferably comprise from about 20 to about 75 weight percent of the polyphenylene ether polymer, from about 20 to about 75 weight percent of the polyphthalamide, from about 0.1 to about 2 weight percent of the compatibilizer and from about 1 to about 25 weight percent of the impact modifier, based on these four components. When the impact modifier is included in compositions comprising the polyphenylene ether polymer, the polyphthalamide, an aliphatic polyamide and a compatibilizer, the compositions preferably comprise from about 30 to about 60 weight percent of the polyphenylene ether polymer, from about 10 to about 40 weight percent of the polyphthalamide, from about 5 to about 40 weight percent of the aliphatic polyamide, from about 0.1 to about 2 weight percent of the compatibilizer and from about 1 to about 25 weight percent of the impact modifier, based on these five components.

The compositions of the present invention may further include conventional additives commonly employed in polyphenylene ether-polyamide compositions. For example, the compositions may include one or more conventional additives, including, but not limited to, thermal stabilizers, color stabilizers, antioxidants, fire retardants, flame retardants, antistatic agents, fillers, reinforcing agents and the like. Additionally, the compositions of the invention may be prepared by any conventional blending technique including, for example, melt mixing.

Compositions of the present invention are illustrated in the following examples. Throughout the examples and the present specification, reference to parts or percentages are by weight, unless otherwise specified.

EXAMPLE 1

In this example, compositions were prepared comprising a polyphenylene ether resin (PPE), a polyphthalamide supplied by Amoco Performance Products, Inc. under the tradename AMODEL (Tg of 274° F. and Tm of 590° F.) and a compatibilizer comprising a polycarboxylic acid, specifically citric acid. The compositions also included an aliphatic polyamide, specifically nylon 6,6 (Tg of 116° F. and Tm of 527° F.) and an impact modifier comprising Kraton-G-1702 supplied by Shell Chemical. The parts by weight of each component included in the compositions of this example are set forth in Table I. With reference to Table I, composition 1A is a comparative composition which does not contain the polyphthalamide, while compositions 1B and 1C contain the polyphthalamide in accordance with the present invention.

Samples of the compositions of this example were subjected to measurement of their Izod impact strength according to ASTM-D256, coefficient of thermal expansion, heat distortion temperature according to ASTM-D648, Dynatup impact strength according to ASTM-D3763-85 and tensile flexural properties according to ASTM-D638. The results of these measurements are also set forth in Table I.

TABLE I

| Composition | 1A | 1B | 1C |
| --- | --- | --- | --- |
| PPE | 54 | 54 | 54 |
| Amodel | 0 | 20 | 30 |
| Nylon 6,6 | 41 | 21 | 11 |
| Kraton G-1702 | 5 | 5 | 5 |
| Citric Acid | 0.6 | 0.6 | 0.6 |
| Notched Izod Impact, ft-lb/inch | | | |
| Room Temperature | 3.8 | 2.8 | 1.9 |
| −20° F. | 2.4 | 1.4 | 0.9 |
| Coefficient of Thermal Expansion | 4.18 | 3.24 | 3.09 |
| Heat Distortion Temperature (66 psi), ° F. | 402 | 398 | 396 |
| Dynatup Impact, ft-lb | | | |
| Room Temperature | 34 | 29 | 5 |
| −20° F. | 7 | 13 | 2 |
| Tensile Yield | 9.5 | 10.2 | 10.5 |
| Tensile Break | 8.2 | 8.4 | 9.1 |
| Flexural Modulus | 342 | 349 | 366 |
| Flexural Strength | 14.5 | 15.2 | 15.9 |
| Elongation % | 36 | 29 | 20 |

From the coefficient of thermal expansion data set forth in Table I, it is apparent that the compositions of the present invention containing the polyphthalamide exhibit reduced coefficients of thermal expansion as compared with conventional composition 1A. Additionally, compositions 1B and 1C according to the present invention did not exhibit any significant reduction in their heat distortion temperatures as compared with conventional composition 1A. Moreover, the compositions of the invention exhibited a good combination of physical properties, and articles molded from these compositions exhibited a good surface appearance.

EXAMPLE 2

In this example, additional compositions were prepared using the components employed in Example 1 with the exception that the citric acid compatibilizer employed in Example 1 was replaced with a compatibilizer comprising a compound containing an acyl functional group. Specifically, the compatibilizer comprised trimellitic anhydride acid chloride and the trimellitic anhydride acid chloride was reacted with a portion of the polyphenylene ether polymer to produce a modified polyphenylene ether polymer as described in the previously cited Aycock et al U.S. Pat. No. 4,600,741. The parts by weight of the components included in the compositions of this example are set forth in Table II. Samples of the compositions of this Example were subjected to measurement of various properties in accordance with the procedures described in Example 1. The results of these measurements are also set forth in Table II.

TABLE II

| Composition | 2A | 2B | 2C | 2D | 2E |
| --- | --- | --- | --- | --- | --- |
| PPE | 25 | 25 | 25 | 25 | 25 |
| Modified PPE | 25 | 25 | 25 | 25 | 25 |
| Amodel | 0 | 10 | 20 | 30 | 40 |
| Nylon 6,6 | 40 | 30 | 20 | 10 | 0 |
| Kraton G-1702 | 10 | 10 | 10 | 10 | 10 |
| Coefficient of Thermal Expansion | 4.6 | 4.3 | 3.8 | — | 3.8 |
| Notched Izod Impact (Room Temperature), ft-lb/inch | 7.7 | 7.1 | 7.7 | 6.8 | 7.3 |
| Dynatup Impact, ft-lb | | | | | |
| Room Temperature | 30.2 | 33.0 | 34.1 | 24.4 | 26.6 |
| −20° F. | 27.2 | 33.8 | 36.6 | 27.4 | 21.9 |
| Heat Distortion Temperature (66 psi), ° F. | 391 | 381 | 387 | 369 | 383 |
| Tensile Yield | 9.0 | 9.5 | 9.4 | 8.5 | 9.4 |
| Tensile Strength | 7.8 | 7.7 | 7.8 | 7.4 | 8.2 |
| Flexural Modulus | 313 | 313 | 311 | 298 | 310 |
| Flexural Strength | 13.1 | 13.5 | 13.4 | 12.6 | 13.6 |
| Elongation, % | 49 | 53 | 31 | 46 | 32 |

Composition 2A of this example represents a comparative composition in that it does not contain the polyphthalamide while compositions 2B-2E include the. polyphthalamide in accordance with the present invention. Compositions 2B, 2C and 2E all exhibited a reduced coefficient of thermal expansion as compared with conventional composition 2A. Additionally, none of compositions 2B-2E exhibited a significant reduction in heat distortion temperature as compared with conventional composition 2A. The compositions 2B-2E according to the present invention also exhibited a good combination of other physical properties as set forth in Table II.

EXAMPLE 3

In this Example, compositions were prepared using the components employed in Example 2 with the exception that the impact modifier Kraton G-1702 employed in the compositions of Example 2 was omitted from the present compositions and impact modifiers selected from Kraton D-1102, Kraton G-1650 and Kraton G-1651 supplied by Shell Chemical Company, and Exxelor 1805 were employed, respectively. The parts by weight of each component employed in the compositions of this example are set forth in Table III. The compositions of this example were subjected to measurement of various properties in accordance with the procedures described in Example 1, and the results of these measurements are set forth in

TABLE III

| Composition | 3A | 3B | 3C | 3D |
| --- | --- | --- | --- | --- |
| PPE | 25 | 25 | 25 | 25 |
| Modified PPE | 25 | 25 | 25 | 25 |
| Amodel | 40 | 40 | 40 | 40 |
| Kraton D-1102 | 10 | — | — | — |
| Kraton G-1650 | — | 10 | — | — |
| Kraton G-1651 | — | — | 10 | — |
| Exxelor 1805 | — | — | — | 10 |
| Notched Izod Impact, ft-lb/inch | 2.0 | 2.1 | 1.0 | 6.5 |
| Dynatup Impact, ft-lb | | | | |
| Room Temperature | 29.0 | 22.0 | 3.6 | 16.3 |
| −20° F. | 3.5 | 4.4 | 1.2 | 7.3 |
| Heat Distortion Temperature (66 psi), ° F. | 349 | 368 | 369 | 381 |
| Tensile Yield | 10.6 | 8.9 | 7.3 | 9.6 |
| Tensile Strength | 9.0 | 8.1 | 7.6 | 8.2 |
| Flexural Modulus | 337 | 299 | 230 | 303 |
| Flexural Strength | 15.3 | 13.0 | 9.7 | 13.3 |
| Elongation, % | 48 | 47 | 24 | 29 |

The results set forth in Table III demonstrate that the mechanical properties of the compositions of the present invention may be varied by addition of specific impact modifiers.

The preceding examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A polymer blend composition, comprising
   (a) a polyphenylene ether polymer,
   (b) a polyphthalamide comprising the reaction product of (i) a mixture of hexamethylene diamine and trimethylhexamethylene diamine, and (ii) terephthalic acid, and optionally (iii) at least one acid selected from the group consisting of isophthalic acid and adipic acid,
   (c) at least one compatibilizer selected from the group consisting of liquid diene polymers, polycarboxylic acids and derivatives thereof, an oxidized polyolefin wax, and a compound containing an acyl functional group,
   (d) at least one aliphatic polyamide selected from the group consisting of polyamide 6, polyamide 66, polyamide 11, polyamide 12, polyamide 63, polyamide 64, polyamide 6/10 and polyamide 6/12, and
   (e) an impact modifier; wherein the impact modifier comprises a polyoctenylene.

2. A polymer blend composition as defined by claim 1, comprising from about 25 to about 75 weight percent of the polyphenylene ether polymer, from about 1 to about 50 weight percent of the polyphthalamide, from about 1 to about 50 weight percent of the aliphatic polyamide, and from about 0.1 to about 2 weight percent of the compatibilizer.

3. A polymer blend composition as defined by claim 2, comprising from about 30 to about 60 weight percent of the polyphenylene ether polymer, from about 10 to about 40 weight percent of the polyphthalamide, from about 5 to about 40 weight percent of the aliphatic polyamide, and from about 0.1 to about 2 weight percent of the compatibilizer.

4. A polymer blend composition as defined by claim 1, comprising from about 20 to about 75 weight percent of the polyphenylene ether polymer, from about 20 to about 75 weight percent of the polyphthalamide, from about 0.1 to about 2 weight percent of the compatibilizer and from about 1 to about 25 weight percent of the impact modifier.

5. A polymer blend composition as defined by claim 1, comprising from about 30 to about 60 weight percent of the polyphenylene ether polymer, from about 10 to about 40 weight percent of the polyphthalamide, from about 5 to about 40 weight percent of the aliphatic polyamide, from about 0.1 to about 2 weight percent of the compatibilizer and from about 1 to about 25 weight percent of the impact modifier.

* * * * *